United States Patent [19]
Gummelt et al.

[11] Patent Number: 5,624,770
[45] Date of Patent: Apr. 29, 1997

[54] BATTERY WITH SIDE WALL RIBS

[75] Inventors: Klaus Gummelt; Christian Böhle, both of Garbsen, Germany

[73] Assignee: VB Autobatterie GmbH, Hanover, Germany

[21] Appl. No.: 506,837

[22] Filed: Jul. 25, 1995

[30] Foreign Application Priority Data

Jul. 28, 1994 [DE] Germany .................... 44 26 770.3

[51] Int. Cl.⁶ .................................................. H01M 2/14
[52] U.S. Cl. ........................ 429/143; 429/176; 429/186
[58] Field of Search ................................ 429/143, 176, 429/186

[56] References Cited

U.S. PATENT DOCUMENTS

| | | | |
|---|---|---|---|
| 3,607,440 | 9/1971 | Olmsted et al. | 429/176 |
| 5,264,304 | 11/1993 | Kragness et al. | 429/143 |
| 5,384,212 | 1/1995 | Heiman et al. | 429/143 |

FOREIGN PATENT DOCUMENTS

| | | |
|---|---|---|
| 0169179 | 1/1986 | European Pat. Off. . |
| 3117917 | 3/1982 | Germany . |
| 3128224 | 6/1982 | Germany . |

*Primary Examiner*—Stephen Kalafut
*Attorney, Agent, or Firm*—Weiser & Associates, P.C.

[57] ABSTRACT

A lead storage battery with a monobloc container receives plate groups in cell compartments which are adjustable in width using a series of side wall ribs. Each rib includes a cell connector formed on the container wall, which is in turn provided with support portions which extend into the container compartment to define a roughly T-shaped cross-section. Each rib is further joined to the bottom of the container along its cross-section. Since the support portions are aligned with, or substantially aligned with the container wall, a large-surface support is provided for receiving a plate group, preventing the potential for wearing into the outermost electrodes of the plate group during vibrational stress, and the failure of the mass which can then result.

15 Claims, 1 Drawing Sheet ns5,624,770

BATTERY WITH SIDE WALL RIBS

BACKGROUND OF THE INVENTION

The present invention relates to storage batteries, especially lead storage batteries, with a plastic monobloc container having vertical walls with separating ribs.

Monobloc containers for lead storage batteries are conventionally produced in several sizes (classes), defining a variety of available battery types. For any given battery type, the capacity of the battery can be varied responsive to need. The need to accommodate different battery types requires the use of different injection molds (for each battery type). Due to cost considerations, this has led to a situation where only a few types (sizes) of batteries are offered. The result has been that only a few standardized outside dimensions are available, with widely differing capacities for any given container type. This is achieved by varying the number of positive and negative plates (i.e., plate groups) within each compartment of the container. This leads to corresponding variations in the cell space which is left free by the installed plate groups. These free spaces are conventionally filled with filler pieces referred to as plug-in separators.

Another expedient for reducing the free spaces in battery containers, to establish the volume required for the plate system to be installed, is to provide the intermediate and end walls with vertical ribs. The vertical ribs serve as spacers, and at the same time stiffen the intermediate walls (i.e., the partitions) while ensuring better electrolyte circulation around the outermost electrode plates of the installed plate groups. An example of such a construction is disclosed, for example, by EP-OS 169,179.

It is also known (for example, from DE-OS 3,117,917 or DE-OS 3,128,224) that the stiffening ribs arranged on the end walls and partitions of the container can be replaced with elastic, spring-like ribs. These ribs are directly formed on the container, extending toward the opposing wall at an angle which deviates from 90°. The use of such ribs is advantageous in that they permit automatic installation of the plate groups, and can be molded to the plate system which is employed. However, a shortcoming is that such ribs can cause damage to the outermost electrode plates during vibrational stresses of the storage battery. This can be remedied by packing spacers against the ribs so that the outermost plates of the plate groups are covered. However, the use of spacers tends to complicate the installation process (with additional components), and makes automation more costly.

SUMMARY OF THE INVENTION

It is therefore the primary object of the present invention to provide a lead storage battery with a monobloc container having ribs on inside walls of the container that permit an automated installation of plate groups in the compartments of the container.

It is also an object of the present invention to provide a lead storage battery with a monobloc container having ribs on inside walls of the container that ensure a suitably rigid positioning of the plate groups, so that the outermost plates are in close contact with the ribs.

It is also an object of the present invention to provide a lead storage battery with a monobloc container having ribs on inside walls of the container that are configured to avoid damage to the outermost plates when the battery is exposed to vibrational stresses.

These and other objects are achieved in accordance with the present invention by providing the storage battery with a series of ribs including a cell connecting portion formed on the wall of the container, and support portions extending from the terminating edge of the cell connecting portion. The support portions preferably project from both sides of the cell connecting portion, into the container, so that a substantially T-shaped cross-section is produced. The ribs are preferably joined to the bottom of the container along their entire cross-section.

Such ribs are advantageously formed during injection molding of the container, particularly since the ribs are preferably "rooted" to the bottom of the container. Rooting of the ribs to the bottom of the container is important so that the ribs are essentially rigid, at least at their lowermost end. Along their uppermost regions, the ribs are in contrast joined to the container along the leg of the cell connecting portion (forming the base of the "T") so that the ribs become increasingly more flexible along their length (i.e., with height).

Upon assembly, the plate groups are introduced into the compartments of the container in a way which is substantially free of friction. Such assembly is further facilitated by tapering the overall profile of the uppermost portions of the ribs. To this end, the support portions terminate with rounded edges, and the cell connecting portion tapers from the rounded edges of the support portions to the container wall.

The support portions of each rib are preferably aligned substantially parallel to the container wall. This permits an installation that offers a large-surface support for the electrode plates, which is quite advantageous in receiving the outermost plates of the plate group. This is to be distinguished from prior support ribs, which conventionally employ narrow support surfaces or exposed edges capable of wearing into the electrode plates during vibrational stresses on the battery (which necessarily leads to failures of the mass). In accordance with the present invention, the plate groups are rigidly held by the ribs, remaining undamaged under similar conditions.

For further discussion regarding the improvements of the present invention, reference is made to the detailed description which is provided below, taken in conjunction with the following illustrations.

DETAILED DESCRIPTION OF PREFERRED EMBODIMENTS

Figure 1B:
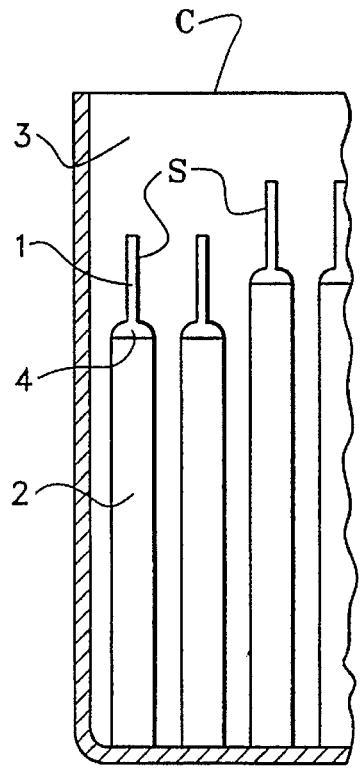
FIG. 1b is a partial, side view of the container and side wall ribs of FIG. 1.
Figure 1A:
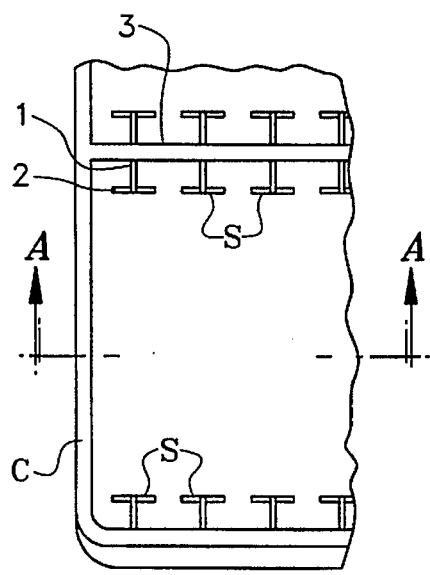
FIG. 1a is a partial, top plan view of a monobloc container with side wall ribs produced according to the present invention, having a T-shaped cross section.

FIG. 1a is a top view, and FIG. 1b is a side view (viewed toward the container partition), of a container C having side wall ribs S with a cross-sectional shape which is T-shaped. Each of the side wall ribs S includes a cell connector 1 extending perpendicularly from the container wall 3 and into the container. A pair of support portions 2 project from the terminating end of each cell connector 1, forming a second arm of the T-shaped ribs. The support portions 2 combine to provide a broad support surface, due to their parallel alignment with the container wall 3, for effectively receiving a plate group (system not shown for purposes of clarity) without the potential for damage due to vibrational stresses of the battery.

As is best seen in FIG. 1b, the support portions 2 are preferably rounded along the upper ends of the ribs, at 4. This helps to avoid sharp edges for contacting the plate groups, making it easier for the plate groups to slide into the cell container upon their assembly. The upper ends of the cell connectors 1 are formed as sloping elements which recede to the container wall 3, to further avoid sharp edges for contacting the plate groups as they are installed.

Figure 2:
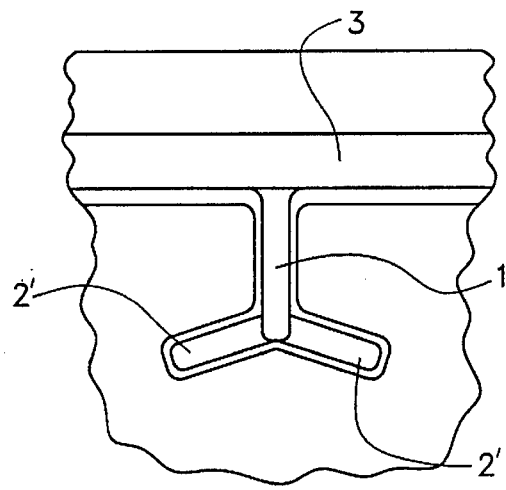
FIGS. 2 and 3 are partial, top plan views of side wall ribs of the present invention having other cross-sectional shapes.
Figure 3:
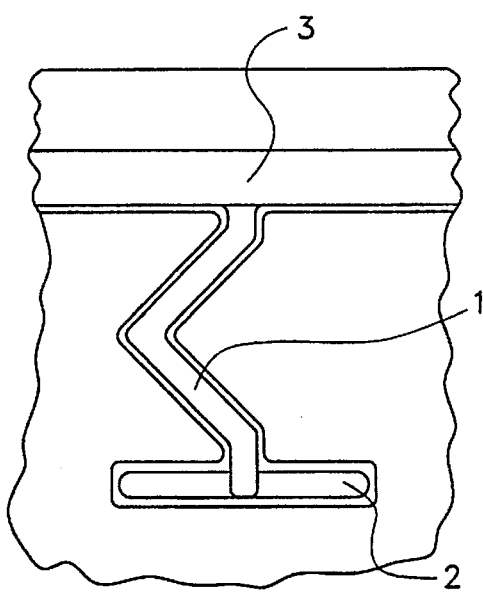

FIG. 2 shows another advantageous shape for the side wall ribs of the present invention. In this configuration, the support portions 2' are angled to develop a Y-shaped cross-section. Upon assembly, the plate groups are pressed into the cell container, and are frictionally retained in position responsive to the spring-like elastic spreading of the slightly angled (Y-shaped) support portions 2' (essentially returning the support portions 2' to a T-shape). In practice, the angle between the arms of the "Y" should not be less than 150°. FIG. 3 also shows a side wall rib of the present invention which has a certain degree of elasticity. In this case, a folded (accordion-like) cell connector 1' is formed on the container wall 3, which can retract as a plate group is received within the cell container to achieve a similar end result.

Irrespective of their embodiment, the side wall ribs of the present invention should combine to define a support surface amounting to at least 40% of the adjoining plate surface, for proper support to result. It has been found to be particularly favorable if about 60% or more of the adjoining plate surfaces are covered. Such conditions can be maintained by adjusting the lengths of the support portions, and the mutual spacings and height of the side wall ribs.

The cell connector (1, 1') of each rib joined to the container should preferably have roughly the same width as the support portions (2, 2'). However, this width should be no greater than the thickness of the container wall (i.e., for battery containers produced from elastic plastics, this thickness should amount to no more than 2 to 5 mm and especially about 2.5 mm). The longest possible support portions are preferred. However, the thickness of the support portions should essentially correspond to the thickness of the cell connectors emerging from the cell wall. The thickness of the cell connector is also limited by the injection molding process, and in certain cases, by the container height. Tall containers will generally require thicker cell connectors than low profile containers due to smooth material flow and good deformability. The thickest possible cell connectors (i.e., a thickness of about 5 mm) are generally prescribed in cases where the ribs are to extend fully to the height of the cover. In such case, the ribs can additionally serve to support the cover of the battery and to take up forces during overhead fastening of the battery. Preferably, the ribs extend farther upwardly toward the upper edge of the container along mid regions of the wall than along the side (lateral) regions (see FIG. 1b).

The side wall ribs of the present invention not only make the storage battery container robot-compatible with respect to electrode (plate group) insertion, but above all permit storage batteries of different capacities to be assembled with correspondingly reduced or increased (in size) plate systems in monobloc containers having the same overall outer dimensions. This is because only the ribs determine the available width, so that both thicker and thinner plate systems can be received without special adaptations. The ribs function as spacers and thus secure the plate groups in a particularly favorable way so that the electrode plates experience no damage during vibration stress. Due to both their material-related and structure-related residual elasticity, the ribs are also in a position to take up tolerances in thickness, such as can occur in plate systems from the same manufacturing lot, or different lots, as well as differences in fastening capacity (of the ribs).

It will be understood that various changes in the details, materials and arrangement of parts which have been herein described and illustrated in order to explain the nature of this invention may be made by those skilled in the art within the principle and scope of the invention as expressed in the following claims.

What is claimed is:

1. A plastic monobloc container for a storage battery having a bottom and container walls including end walls and partitions for defining container compartments for receiving plate groups of the battery, and comprising a plurality of ribs formed on the end walls and the partitions which extend into the container compartments for engaging an adjoining plate group, wherein the ribs include a cell connector member having a first edge which is formed on the container walls and a second edge opposing the first edge which includes support members projecting in opposing directions from the cell connector member and into the container, wherein the cell connector member is aligned substantially perpendicular to the container walls and the support members are aligned substantially parallel with the container walls, to define a substantially T-shaped cross-section, and wherein the cell connector member and the support members are fully joined to the bottom of the container.

2. The monobloc container of claim 1 wherein the support members have a combined length which is substantially the same as the length of the cell connector member.

3. The monobloc container of claim 1 wherein the cell connector member has a thickness not greater than the thickness of the container walls.

4. The monobloc container of claim 1 wherein the support members combine to define a support surface for overlying at least 40% of outermost plate surfaces of the adjoining plate group.

5. The monobloc container of claim 4 wherein about 60% of the outermost plate surfaces of the adjoining plate group are covered by the support members.

6. A plastic monobloc container of for a storage battery having a bottom and container walls including end walls and partitions for defining container compartments for receiving plate groups of the battery, and comprising a plurality of ribs formed on the end walls and the partitions which extend into the container compartments for engaging an adjoining plate group, wherein the ribs include a cell connector member having a first which is formed on the container walls and a second edge posing the first edge which includes support members projecting in in oppose in directions from the cell connector member and into the container, wherein the support members form an angle with the container walls, to define a substantially Y-shaped cross-section, and wherein the cell connector member and the support members are fully joined to the bottom of the container.

7. The monobloc container of claim 6 wherein the support members have a combined length which is substantially the same as the length of the cell connector member.

8. The monobloc container of claim 6 wherein the cell connector member has a thickness not greater than the thickness of the container walls.

9. The monobloc container of claim 6 wherein the support members combine to define a support surface for overlying at least 40% of outermost plate surfaces of the adjoining plate group.

10. The monobloc container of claim 9 wherein about 60% of the outermost plate surfaces of the adjoining plate group are covered by the support members.

11. A plastic monobloc container for a storage battery having a bottom and container walls including end walls and partitions for defining container compartments for receiving plate groups of the battery, and comprising plurality of ribs formed on the end walls and the partitions which extend into the container compartments for engaging an adjoining plate group being the ribs include a cell connector member having a first edge which is formed on the container walls and a second edge opposing the first edge which includes support members projecting in opposing directions from the cell connector member and into the container, wherein the cell connector member includes an accordion-shaped fold, and wherein the cell connector member and the support members are fully joined to the bottom of the container.

12. The monobloc container of claim 11 wherein the support members have a combined length which is substantially the same as the distance from the support members to the container walls which receive the cell connector members.

13. The monobloc container of claim 11 wherein the cell connector member has a thickness not greater than the thickness of the container walls.

14. The monobloc container of claim 11 wherein the support members combine to define a support surface for overlying at least 40% of outermost plate surfaces of the adjoining plate group.

15. The monobloc container of claim 14 wherein about 60% of the outermost plate surfaces of the adjoining plate group are covered by the support members.

* * * * *